(12) United States Patent
Malyshev et al.

(10) Patent No.: US 9,563,878 B2
(45) Date of Patent: Feb. 7, 2017

(54) SYSTEM AND METHOD FOR INTELLIGENT DATA MAPPING, INCLUDING DISCOVERY, IDENTIFICATION, CORRELATION AND EXHIBIT OF CRM RELATED COMMUNICATION DATA

(75) Inventors: Stanislav Malyshev, San Jose, CA (US); Lila Tretikov, Los Gatos, CA (US); Clint Oram, San Mateo, CA (US); Larry Augustin, Los Altos, CA (US); Majed Itani, San Jose, CA (US); Andreas Sandberg, Redwood City, CA (US); Jenny Gonsalves, Union City, CA (US)

(73) Assignee: SugarCRM Inc., Cupertino, CA (US)

( * ) Notice: Subject to any disclaimer, the term of this patent is extended or adjusted under 35 U.S.C. 154(b) by 1096 days.

(21) Appl. No.: 13/019,295

(22) Filed: Feb. 1, 2011

(65) Prior Publication Data

US 2012/0197907 A1 Aug. 2, 2012

(51) Int. Cl.
*G06F 17/30* (2006.01)
*G06Q 10/10* (2012.01)
*G06Q 10/06* (2012.01)

(52) U.S. Cl.
CPC ....... *G06Q 10/107* (2013.01); *G06Q 10/06311* (2013.01)

(58) Field of Classification Search
CPC ...................................................... G06F 17/30
See application file for complete search history.

(56) References Cited

U.S. PATENT DOCUMENTS

| | | | |
|---|---|---|---|
| 2007/0005590 A1* | 1/2007 | Thrasher | 707/5 |
| 2008/0091734 A1* | 4/2008 | Bauchot et al. | 707/200 |
| 2008/0091774 A1* | 4/2008 | Taylor et al. | 709/203 |
| 2012/0042263 A1* | 2/2012 | Rapaport et al. | 715/753 |

* cited by examiner

*Primary Examiner* — Mahesh Dwivedi
*Assistant Examiner* — Johnese Johnson
(74) *Attorney, Agent, or Firm* — Steven M. Greenberg, Esq.; CRGO LAW

(57) ABSTRACT

A system and method for performing automatic detection, storage, correlation and retrieval of specific electronic communications data from heterogeneous computer systems and storage with non-normalized representation of this data on a computer system running specialized software are provided.

44 Claims, 15 Drawing Sheets

FIG. 11

« HISTORY

[CREATE NOTE OR ATTACHMENT] [ARCHIVE EMAIL] [VIEW SUMMARY]

| SUBJECT ◆ | STATUS ◆ | CONTACT ◆ | DATE MODIFIED ◆ | DATE CREATED ◆ | ASSIGNED USER ◆ |
|---|---|---|---|---|---|
| ✉ 📎 RE: SUGAR CRM INFORMATION | INBOUND | | 2011-01-27 15:30 | 2011-01-27 15:30 | SNIP USER  ⊘ EDIT |

[CONFIGURE SNIP] [DISABLE SNIP]

REGISTER FOR SNIP

THIS SUGARCRM INSTANCE URL: [HTTP://] [SUGAR/SERVICE/V3SR]

SNIP SERVICE URL: [HTTP://LOCALHOST:20000/]

[CANCEL]

[CONFIGURE SNIP] [DISABLE SNIP]

SNIP ARCHIVING STATUS:

| ACCOUNT | STATUS | LAST SUCCESSFUL RUN |
|---|---|---|
| MAIN INSTANCE | OK | |
| SNIP@                  .COM(S                  .COM) | DOWN | 12/07/2010 08:47AM |

[CANCEL]

CONTACT HISTORY

| SUBJECT | STATUS | DATE MODIFIED | ASSIGNED USER | |
|---|---|---|---|---|
| RE: [CASE 64168] OUTLOOK PLUGIN SYNC | UNREAD | 2010-11-05 17:10 | ASE-TEAM | EDIT |
| RE: [CASE 64168] OUTLOOK PLUGIN SYNC | SENT | 2010-11-05 17:07 | CCOOPER | EDIT |
| RE: [CASE 64168] OUTLOOK PLUGIN SYNC | READ | 2010-11-05 16:38 | CCOOPER | EDIT |
| RE: [CASE 64168] OUTLOOK PLUGIN SYNC | READ | 2010-11-05 16:38 | CCOOPER | EDIT |
| RE: [CASE 64168] OUTLOOK PLUGIN SYNC | SENT | 2010-11-04 07:10 | CCOOPER | EDIT |

EMAIL CONTACTS

| SELECT | NAME | ACCOUNT NAME | EMAIL | |
|---|---|---|---|---|
| | JAN SYSMANS | SUGARCRM | JSYSMANS@SUGARCRM.COM | EDIT |

« ACTIVITIES

[CREATE TASK] [SCHEDULE MEETING] [LOG CALL] [COMPOSE EMAIL]

| CLOSE | | SUBJECT ⬥ | STATUS ⬥ | CONTACT ⬥ | DUE DATE ⬥ | ASSIGNED USER ⬥ | | (1-3 OF 3) |
|---|---|---|---|---|---|---|---|---|
| ☐ | ⊗ | SEND FAX | IN PROGRESS | ANTONIO AHO | 06/06/2011 03:30PM | SARAH SMITH | ⊘EDIT ⊖REM | |
| | ⊗ | CANCELED SNIP TEST 10 | PLANNED | STAN ADEN | 09/20/2010 08:00PM | ADMINISTRATOR | ⊘EDIT ⊖REM | |
| | ⊗ | SNIP TEST 10 | PLANNED | STAN ADEN | 09/20/2010 08:00PM | ADMINISTRATOR | ⊘EDIT ⊖REM | |

« HISTORY

[CREATE NOTE OR ATTACHMENT] [ARCHIVE EMAIL] [VIEW SUMMARY]

| | SUBJECT ⬥ | STATUS ⬥ | CONTACT ⬥ | DATE MODIFIED ⬥ | ASSIGNED USER ⬥ | | (1-10 OF 11+) |
|---|---|---|---|---|---|---|---|
| ☒ | RE: I NEED SUPER-FAST HELP | INBOUND | | 11/24/2010 01:51PM | ADMINISTRATOR | ⊘EDIT | |
| ☒ | RE: I NEED SUPER-FAST HELP | INBOUND | | 11/24/2010 01:51PM | ADMINISTRATOR | ⊘EDIT | |
| ☒ | RE: I NEED SUPER-FAST HELP | INBOUND | | 11/23/2010 10:21PM | ADMINISTRATOR | ⊘EDIT | |
| ☒ | RE: I NEED SUPER-FAST HELP | INBOUND | | 11/24/2010 10:11AM | ADMINISTRATOR | ⊘EDIT | |
| ☒ | RE: I NEED SUPER-FAST HELP | INBOUND | | 11/24/2010 09:51AM | ADMINISTRATOR | ⊘EDIT | |
| ☒ | I NEED SUPER-FAST HELP | INBOUND | | 11/23/2010 09:11AM | ADMINISTRATOR | ⊘EDIT | |
| ☒ | DEPLOYMENT PROBLEM WITH SUGAR CRM UPLOAD MODULE AND UPGRADE MODULE | INBOUND | | 11/15/2010 01:21PM | ADMINISTRATOR | ⊘EDIT | |
| ☒ | RE: TEAM ACCESS | INBOUND | | 09/21/2010 01:01AM | ADMINISTRATOR | ⊘EDIT | |
| ☒ | CANCELED SNIP TEST 10 | INBOUND | | 09/19/2010 07:41AM | ADMINISTRATOR | ⊘EDIT | |
| ☒ | SNIP TEST 10 | READ | | 09/19/2010 07:30AM | ADMINISTRATOR | ⊘EDIT | |

« OPPORTUNITIES

[CREATE] [SELECT]

| | NAME ⬥ | ACCOUNT NAME ⬥ | SALES STAGE ⬥ | CLOSE ⬥ | AMOUNT ⬥ | ASSIGNED USER ⬥ | (1-1 OF 1) |
|---|---|---|---|---|---|---|---|

FIG. 16

SYSTEM AND METHOD FOR INTELLIGENT DATA MAPPING, INCLUDING DISCOVERY, IDENTIFICATION, CORRELATION AND EXHIBIT OF CRM RELATED COMMUNICATION DATA

FIELD

The disclosure relates to a unit, that can be implemented in computer software application, for performing automatic detection, storage, correlation and retrieval of specific electronic communications data from heterogeneous computer systems and storage with non-normalized representation of this data on a computer system running specialized software.

BACKGROUND

Electronic communications play a large role in modern life, and this includes any modern business. Thus, it is very important for an application managing computerized database containing information relating to business activities to be able to keep full and up-to-date picture of the electronic communications data pertaining to these activities.

However, this may present a number of challenges, since there are many different internal and external systems used to perform communications: electronic mail (corporate and personal), instant messaging, social communications (such as Facebook, Twitter, LinkedIn, etc.), SMS, Web Logs, etc. In a large organization, employees can use a variety of ways to send and receive communications, and it may be problematic to ensure that the communications pertaining to business activities is properly archived in the system managing the company's data and can be readily found and accessed when the need arises.

As of today, the vast majority of data within a customer relationship management (CRM) system is entered by hand. This leads to three major issues. First, the amount of time that it takes a CRM system to become useful is directly proportional to the amount of time it takes to enter in the initial data set. This leads to longer ramp up times and higher initial costs for getting users onto a CRM system. It also leads to a delay in the user's ability to appreciate the usefulness of the CRM system. The second problem is the loss of the relationship aspect of Customer Relationship Management. Most associations of real-time data require manual input. This leads to a data gap between the interactions with a customer, and what is stored in the CRM system. This is compounded with the fact that most companies may go several months without any interactions with a customer at all so that the CRM system and the Company may lose grasp of that relationship. The third problem is when a Company representative is prepping for a call, they need to gather data from various sources (linked-in, google, corporate website, etc. to prepare themselves for that call since the data in their CRM system may very well be out of date, or not exist at all.

There are various existing solutions allowing exporting the data from one system storing the email or other electronic communications data into another, and electronic mail protocols allow for automatic creation of copies of messages sent and received for archival and search. However, these systems have substantial downsides, such as:

1. Operation requires client-side or peer-side software installation: Most of these systems need the user to explicitly install some software, which can depend on the computer platform, operating system and its version, email server software type and configuration, etc. and requires repeated maintenance and attention from a qualified professional. Both installation and maintenance of such a solution may carry a substantial cost both in time and money.
2. Control is user-based and manual: Many of these systems require explicit user-controlled action each time some data is to be copied from one system (such as email storage) to another (such as company business data management application), which leads to dependency on the user to always vigilantly keep both systems up-to-date. If a user is unable to perform needed actions to ensure replication, the data will be inaccessible to the company.
3. Limited support of communication technologies: Many of these systems work only with specific email server or client software. Therefore if the user chooses to perform the same tasks using different software solutions, the system is unable to ensure proper data sharing.
4. Many systems, while efficiently managing one specific type of communication, such as email and email-related information, are frequently unable to relate this information to other business data—such as information about clients, activities, orders—stored in different application.
5. Many of these systems target specifically only single type of electronic communication medium—such as email—and can not easily be extended to target emerging communication channels such as social networks, micro-blogging platforms, SMS communication, and other communication media.
6. Some communication systems perform well only when all communications are performed exclusively through the system. Thus, if a communication arrives through a channel that is not related to the system—such as email sent to a different mailbox or a text message—existing systems are either unable to integrate the information or require substantial work and technical expertise to do it.
7. Some communication systems do not have a way to distinguish between communications relevant to the business or personal data and correlate those business communications to such data while filtering out unrelated communication, which should not be archived since such information is not useful for business purposes. Some communication systems that allow such distinction require the user or supporting stuff to create complex sets of rules to achieve it and constantly maintain these rules to ensure they are up-to-date.

Thus, it is desirable to provide a system and method that overcomes the limitations of existing systems and it is at least to this end that the disclosure is directed.

SUMMARY

A system and method for performing automatic detection, storage, correlation and retrieval of specific electronic communications data from heterogeneous computer systems and storage with non-normalized representation of this data on a computer system running specialized software are provided. The system allows for automatic import of electronic data into a business data managing system, such as a software application managing business-related data (such as a CRM system), without the need for any additional software to be installed by the user and without any need for explicit user actions, while allowing the user of the CRM system to view the communications data from within the CRM application.

This data appears in the CRM system after being collected from multiple heterogeneous sources, correlated amongst itself and with the data tracked within the CRM system, associated with specific data entities within the CRM system (such as clients, companies, deals, etc.) and tagged, linked and exposed appropriately to the CRM user via a user interface of the CRM system.

BRIEF DESCRIPTION OF THE DRAWINGS

FIG. 11 illustrates an example of a history view user interface of the system;

FIG. 12 illustrates an example of a SNIP configuration user interface of the system;

FIG. 13 illustrates an example of a contact history user interface of the system;

FIG. 14 illustrates an example of an email contacts user interface of the system;

FIG. 15 illustrates an example of an activities and history user interface derived from SNIP on Contacts detail View; and FIG. 16 illustrates an example of a contacts detail view user interface with activities derived from SNIP.

DETAILED DESCRIPTION OF ONE OR MORE EMBODIMENTS

The system and method are applicable to any client-server architecture that needs to provide distributed clients with the ability to render user interface components and manage interactions as defined and provided by a server application. It is in this context that the invention will be described. It will be appreciated, however, that the methods, algorithms, and implementation in accordance with the invention has greater utility, such as the ability to be utilized in different architectural designs including but not limited to embedded systems, stand-alone applications, peer-to-peer architectures, etc. For purposes of illustration, the described system is an implementation in a customer relationship management (CRM) system that is SugarCRM Inc.'s Enterprise Edition 6.1. Example systems are used for illustration purposes only and do not pre-suppose any specific functionalities.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1A:
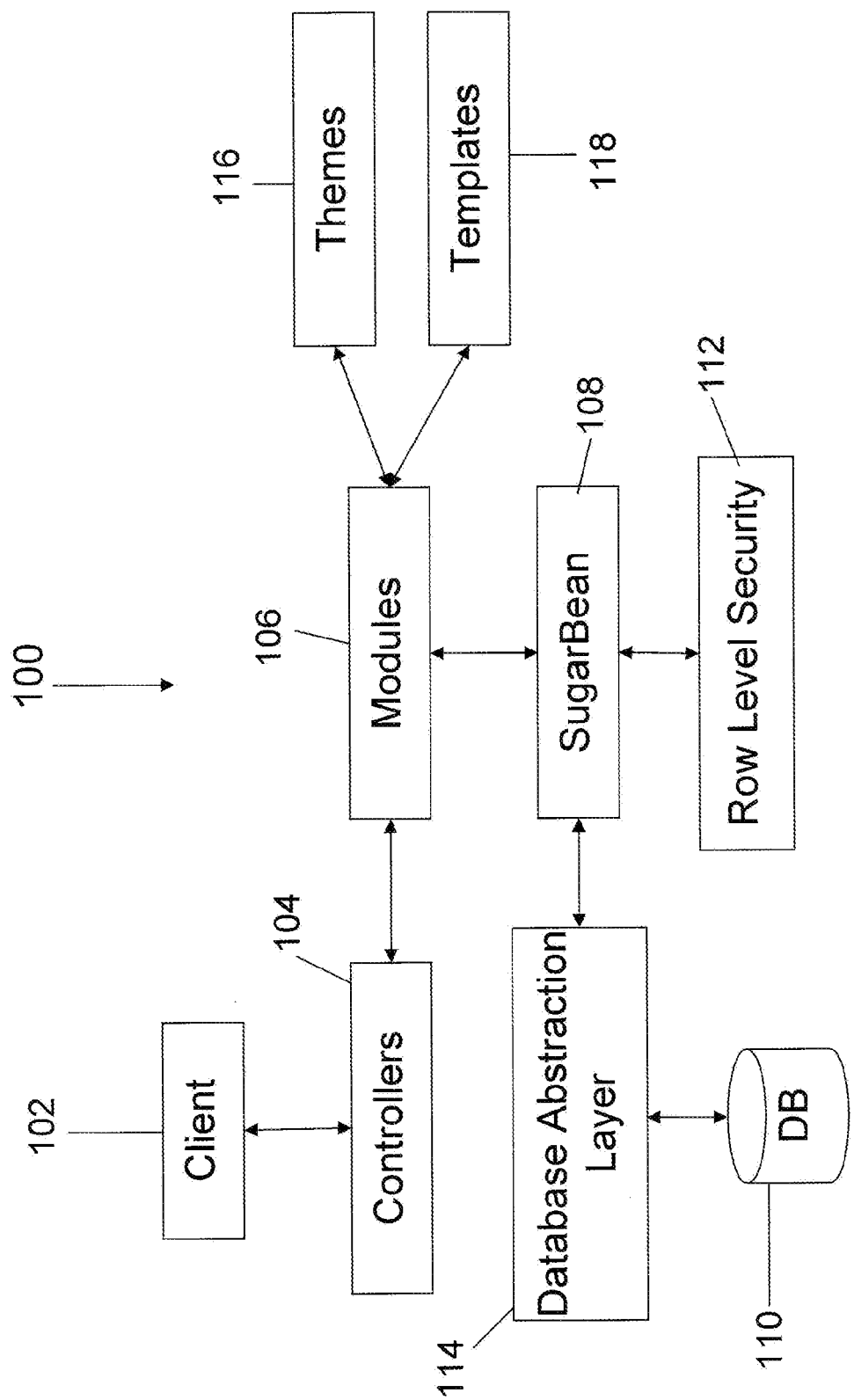
FIG. 1A is a diagram illustrating an implementation of a business software application system, implementing a customer relationship management system, that incorporates various features.
Figure 1B:
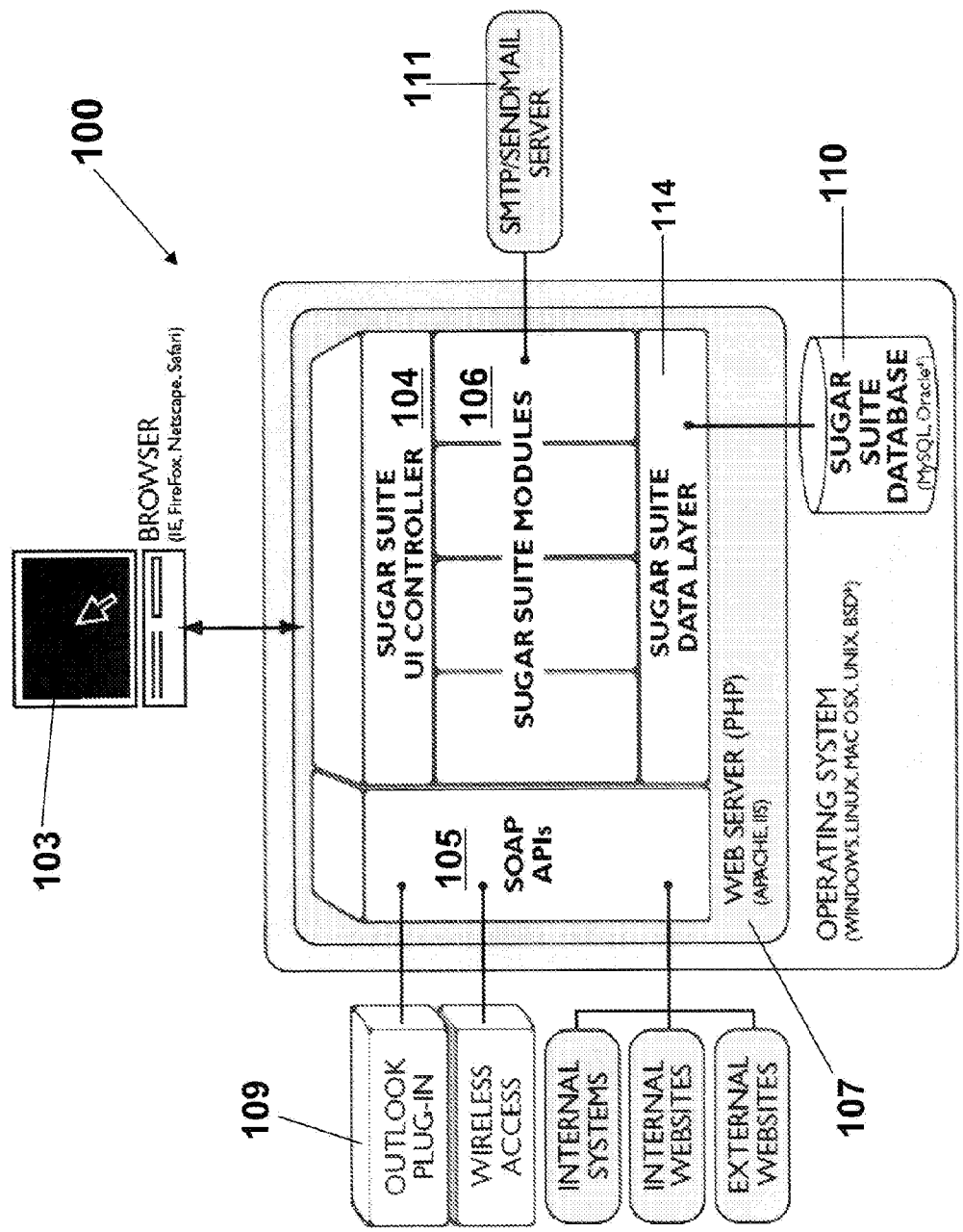
FIG. 1B illustrates more details of the business software application system that incorporates various features.

FIG. 1A is a diagram illustrating a customer relationship management (CRM) system 100 that is an example of a software-based business software application that may be used with the communications data system. In one embodiment, the system 100 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 110 that stores the data associated with the system 100. The system may have one or more clients 102, such as a browser application executed on a typical computing device (a browser client session), that accesses the system over a communications network such as the Internet, a cellular network, a wireless network and the like. The computing devices may include a laptop, table or desktop computer system, a PDA, a mobile phone, a portable wireless email device and the like. The client's 102 interactions with the system are managed and go through a set of one or more controllers 104. The controllers 104 are the entry-point into the system for an entity that is using the system wherein the entity may be a person who accesses the system, such as by using a browser application, a computing device or a software program that uses this entry point. The controllers 104 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 106 that are components of application functionality and provide certain functionality to the entity accessing the system. The modules 106 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 108 and each module references the SugarBean to retrieve the data from the database 110 required for display and uses certain functions and operations instantiated in the SugarBean base object.

Figure 2:
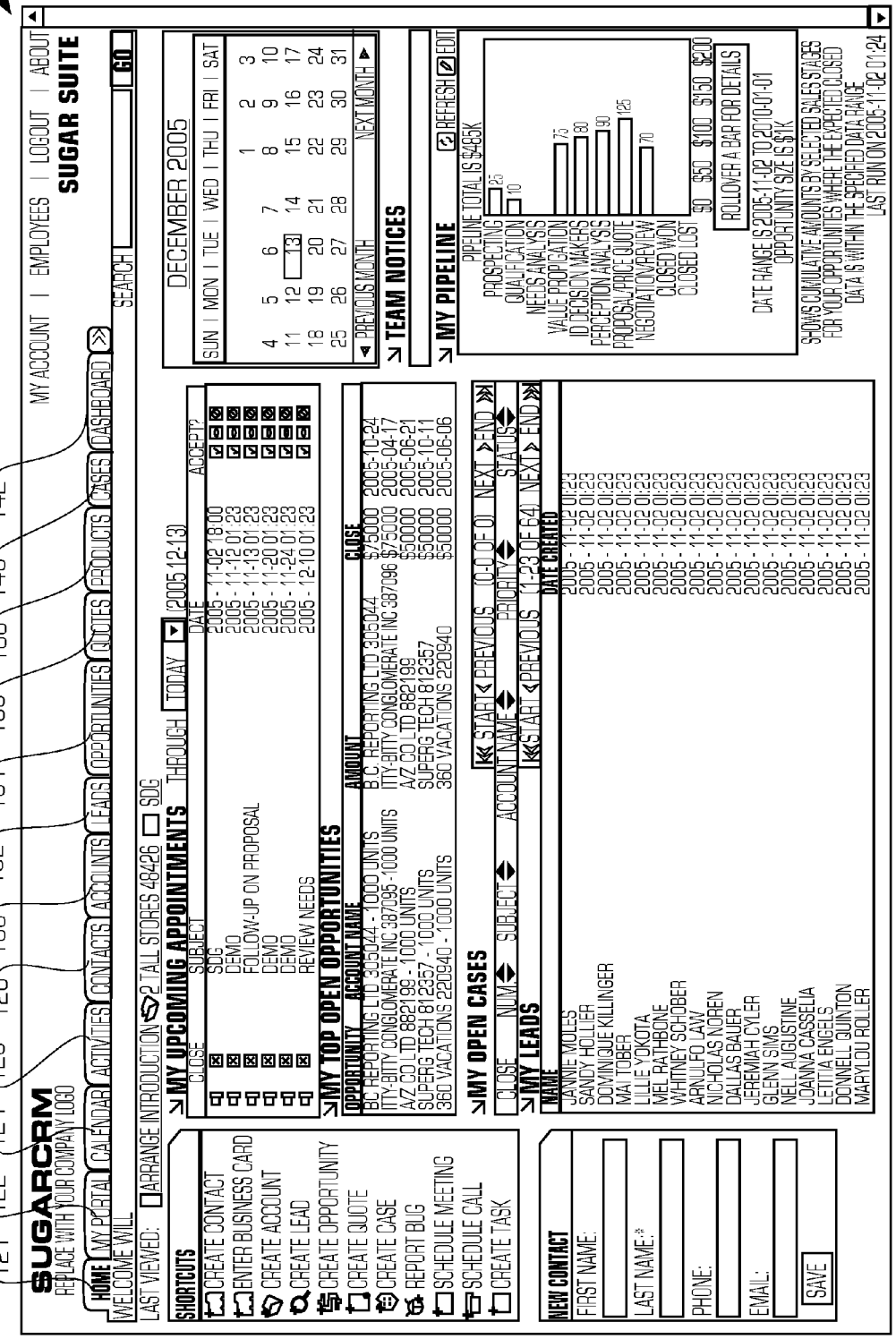
FIG. 2 is a diagram illustrating an example of the user interface of the system in FIGS. 1A and 1B.

FIG. 2 is a diagram illustrating an example of the user interface 120 of the system in FIGS. 1A and 1B. The user interface may include a home tab 121 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 122), contains a series of shortcuts which can link to any web site chosen by the user that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with, for example, Accounts, Contacts, or Opportunities among other modules in the system and the system is not limited to a quote being associated with any particular set of modules.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard module may be accessed using a dashboard tab 142 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and re-submit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 110 that contains the data of the system and a security module 112 (row level security) that implements the security methods to control access to the data in the database 110 since the database is shared by all users of the system and the data must be segregated based on the users and their access level to different pieces of data. The system may also include a database abstraction layer 114 that is coupled between the database 110 and the SugarBean object 108 and acts as an interface between the database 110 and the SugarBean object 108. The SugarBean object 108 provides the base logic required for retrieving, making available and writing information to/from the database and each module creates subclasses of SugarBean (an example of which was described above) to provide module specific details, module specific data and module specific data views. During the process of retrieving data from the database, the SugarBean 108 makes calls that populate the row level security information into the SQL engine/database management system that retrieves the data.

Once the data is retrieved from the database by the SugarBean object 108, the module uses a template mechanism 118 and a theme 116 to produce the requested presentation (user interface) for the user. The template mechanism reformats the data from the database 110 into a particular form while the theme adjusts the user interface according to the user's preferences.

If, for instance, the user requests an HTML presentation of the detail view of the contact module for a specified contact, the system may perform that request as will now be described. The request of the user is directed to controller named index.php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 112. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 118 and the code for the current user's theme (retrieved by the theme module 116) is used to create the user interface for the presentation of the particular Contact data to the particular user. The resulting user interface then is sent back to the computing device with of client that requested it.

FIG. 1B illustrates more details of the customer relationship management system 100. Like elements shown in FIGS. 1A and 1B have like reference numerals. The system may interface with a typical browser application 103 (being executed by a computing device) that can access the system 100 over the web. For example, the examples of the user interface below are web-based views generated by the system and displayed on a browser application. The system may further comprise an application programming interface (APIs) portion 105, that may preferably use the well known simple object access protocol (SOAP), to interface with other existing system and applications. For example, the APIs may be used to interface to an email plug-in 109, such as an SugarCRM Plug-In for Microsoft Outlook®, that enhances the email program to allow it to interact with the system 100. As shown, the system 100, in one implementation, is implemented on a web server application 107 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 100 may also have an email module 111 capable of sending email via a local program (that may preferably be sendmail) or an email server leveraging the SMTP protocol.

Figure 3:
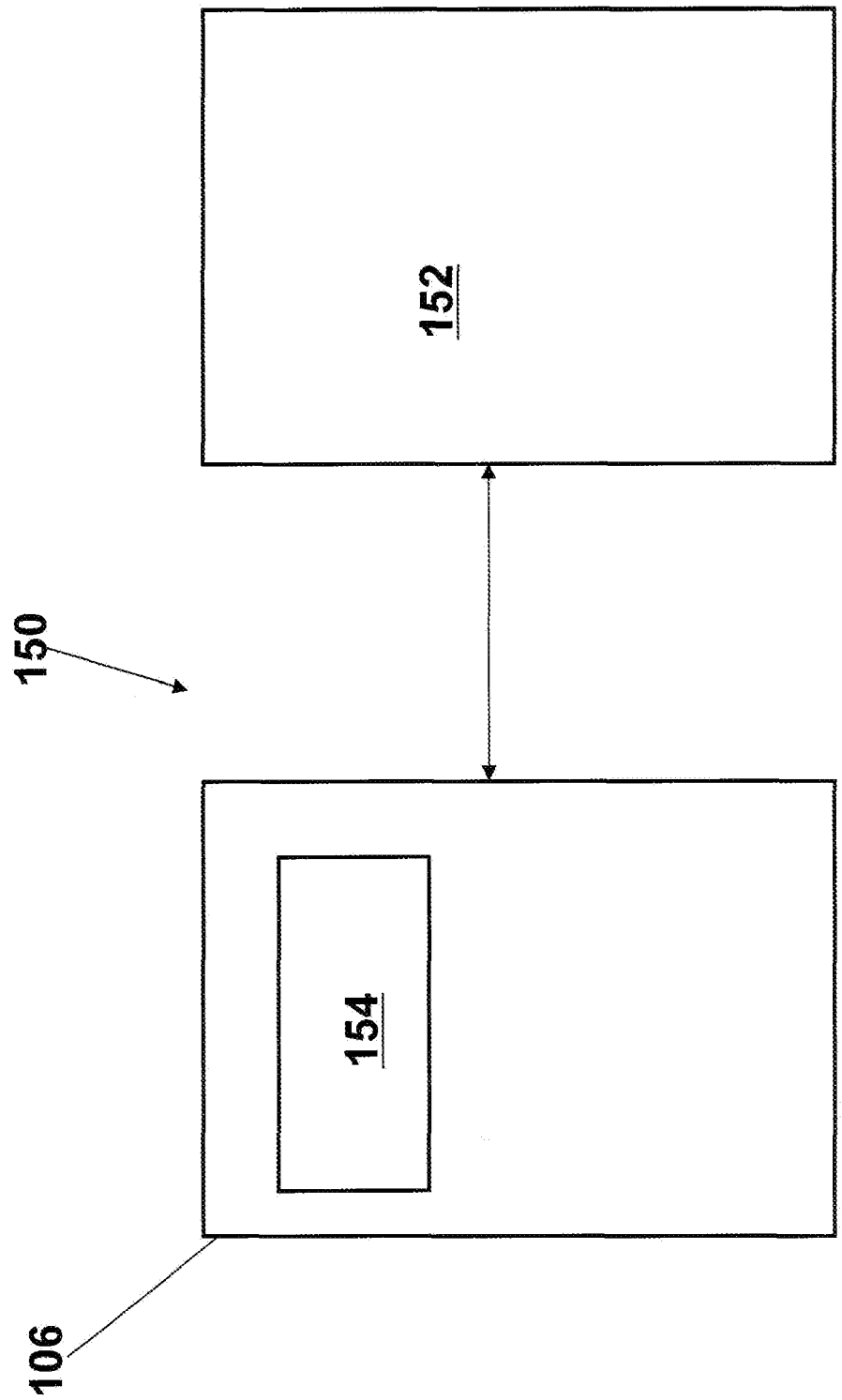
FIG. 3 illustrates an example of an implementation of a system for performing automatic detection, storage, correlation and retrieval of specific electronic communications data from heterogeneous computer systems and storage with non-normalized representation of this data on a computer system running specialized software.

FIG. 3 illustrates an example of an implementation of a system 150 for performing automatic detection, storage, correlation and retrieval of specific electronic communications data from heterogeneous computer systems and storage with non-normalized representation of this data on a computer system running specialized software that can be used in conjunction with the CRM system described above.

In one implementation, the system 150 further comprises one or more import systems (IS) 152 and a data management and presentation module (DPM) 154 that may be one of the modules 106 of the CRM system. Each IS may be configured with one or more information sources and information sources may be represented by any network-accessible content source including, but not limited to electronic mail (corporate and personal), instant messaging, social communications (such as Facebook, Twitter, LinkedIn, etc.), SMS, Web Logs, internet-accessible content/web page, news feeds, FTP sites, etc. The information source(s) may be configured at the IS level, however access to the specific uniquely identifiable data within that source along with the access validation and control rights is controlled by the DPM that is configured for this IS. Uniquely identifiable data must be sourced from the "owner" CRM system and used by the IS to identify and retrieve relevant data from the information source.

In one embodiment, the IS 152 is implemented as a multi-threaded continuously running software application process capable of performing a number of tasks, such as:
1. Find entities that are due for periodic check.
2. Check specific entities for new communication/information.
3. Retrieve relevant communication/information.
4. Inter-correlate and filter messages/data based on commonalities.
5. Send the retrieved messages to the CRM for correlation with CRM data.

The IS 152 also contains stores, such as databases, which stores the following data:
1. Configuration of each CRM subscriber system related to this particular IS.
2. Configuration of all external server accounts related to each CRM.
3. Status of the data retrieval for each external server account and status of data import for each CRM.
4. List of email addresses or other uniquely identifiable information relevant for each CRM.
5. List of messages or other data retrieved from external server to be sent to CRM.
6. List of external sources and any required authentication (can be exclusion or inclusion based) to track and correlate with CRM data.
7. Matching parameters for data discovery The IS 152 also contains a configuration process, that may be implemented as a service within a computer operating system that allows the configuration process to:
1. Check the status of the IS system.
2. Add new CRM system to the IS.
3. Remove the CRM system from the IS.
4. Add external communication service or a network accessible content source to the list of monitored sources.
5. Provide authentication parameters/keys to an external communication service or a network accessible content source.
6. Make an external communication service or a network accessible content source available to a CRM for data intelligence mapping.
7. Remove external communication service account or a network accessible content source from the list of monitored sources.
8. Add/remove primary data identifiers.

The DPM 154 (which in a particular implementation may be a module 106 in the SugarCRM application as shown in FIG. 3, further referred to as the "CRM client"), which is connected to the IS and performs the following functions:
1. Receives, parses, and extracts data from the IS and adds them to the CRM database.
2. Correlates data received from IS sources with CRM internally generated data based on content, time, conversation affiliation (conversation threading), and other configurable parameters.
3. Determines appropriate record types to be created from the IS-sourced data.
4. Creates new records based on the content of the data received from the IS.
5. Associates new records created from the IS content to the CRM tracked entities based on key identifier matches or unique string correlation.
6. Displays the new IS-sourced records with a record along with the record data in the CRM user interface.
7. Passes uniquely identifiable information to the IS for monitoring.

Figure 4:
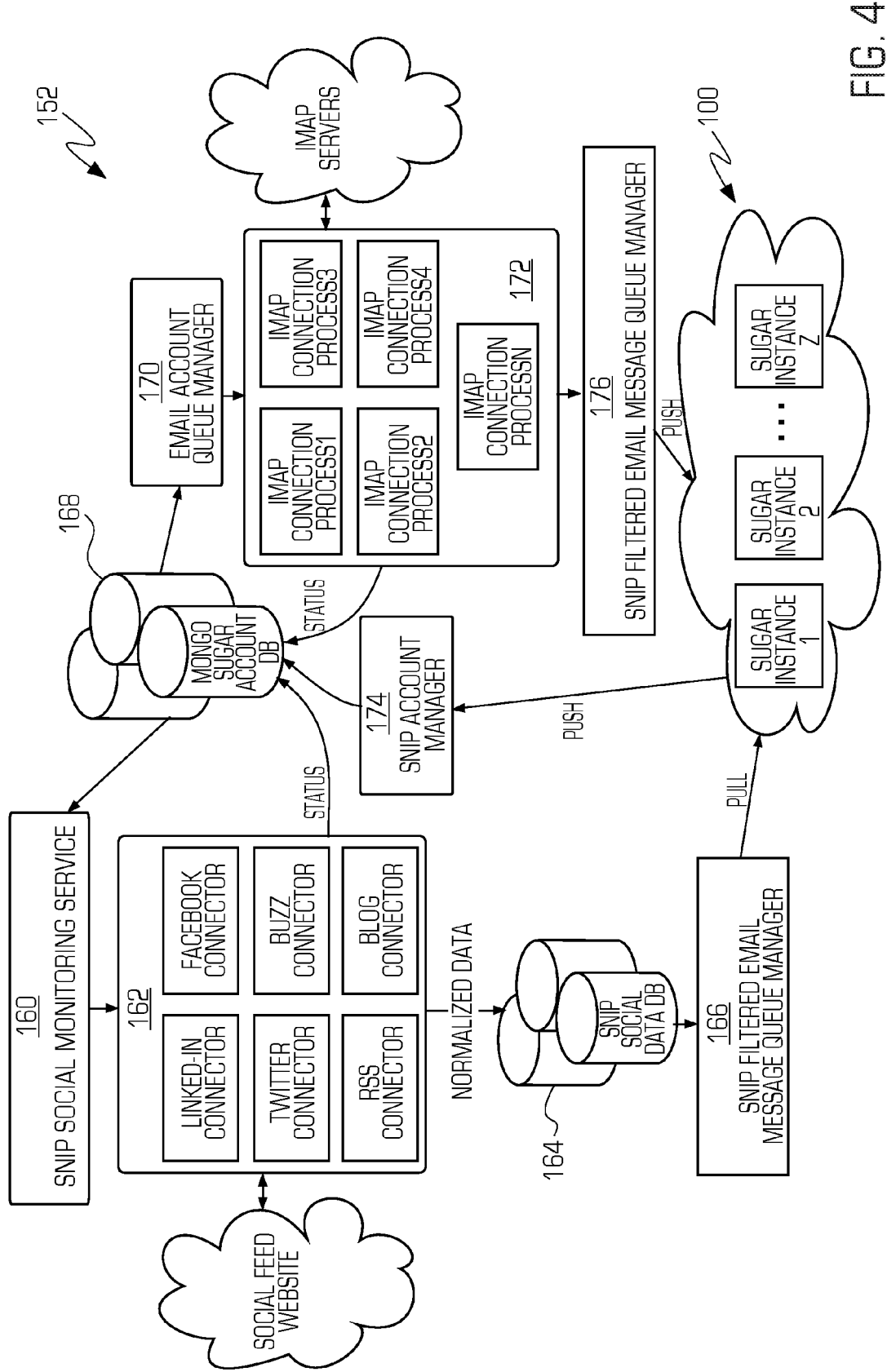
FIG. 4 illustrates more details of an implementation of a system for performing automatic detection, storage, correlation and retrieval of specific electronic communications data from heterogeneous computer systems and storage with non-normalized representation of this data on a computer system running specialized software.

FIG. 4 illustrates more details of the system that includes the IS 152 and one or more business software system 100 instances. As shown, the IS may interface to social feed websites as well as IMAP servers. The IS 152 may include a SNIP monitoring service 160 and one or more connectors 162 that allow the IS to connect to the various social feed websites as shown so that the social fee data may be stored as normalized data in a social data store 164 that is part of the system. The IS also may include a filtered email message queue manager 166 that has data pulled from it by each CRM instance. The IS also may include an account database 168 (that is part of the CRM system) that receives status from various components and an email account queue manager 170 that connects to one or more email connectors 172 that connect to different email connection processes. The IS 152 also may have a SNIP account manager 174 that has data pushed to it from the CRM instances and then reports status to the account database 168. The output from the one or more connectors 172 are fed to a filtered email queue manager 176 that then pushes the data to the CRM instances.

A. The Import System

The import system 152 may be implemented as a generic worker task server, which can be run on either single or distributed computer systems. The server is based on the Distributed Task Queue software pattern, which allows reliable scheduling and execution of tasks over a set of computer systems. Due to this architecture, the Import System is specifically well suited for cloud-based architectures as it has no single point of failure and distributed by design.

A1. Worker Tasks

Figure 5:
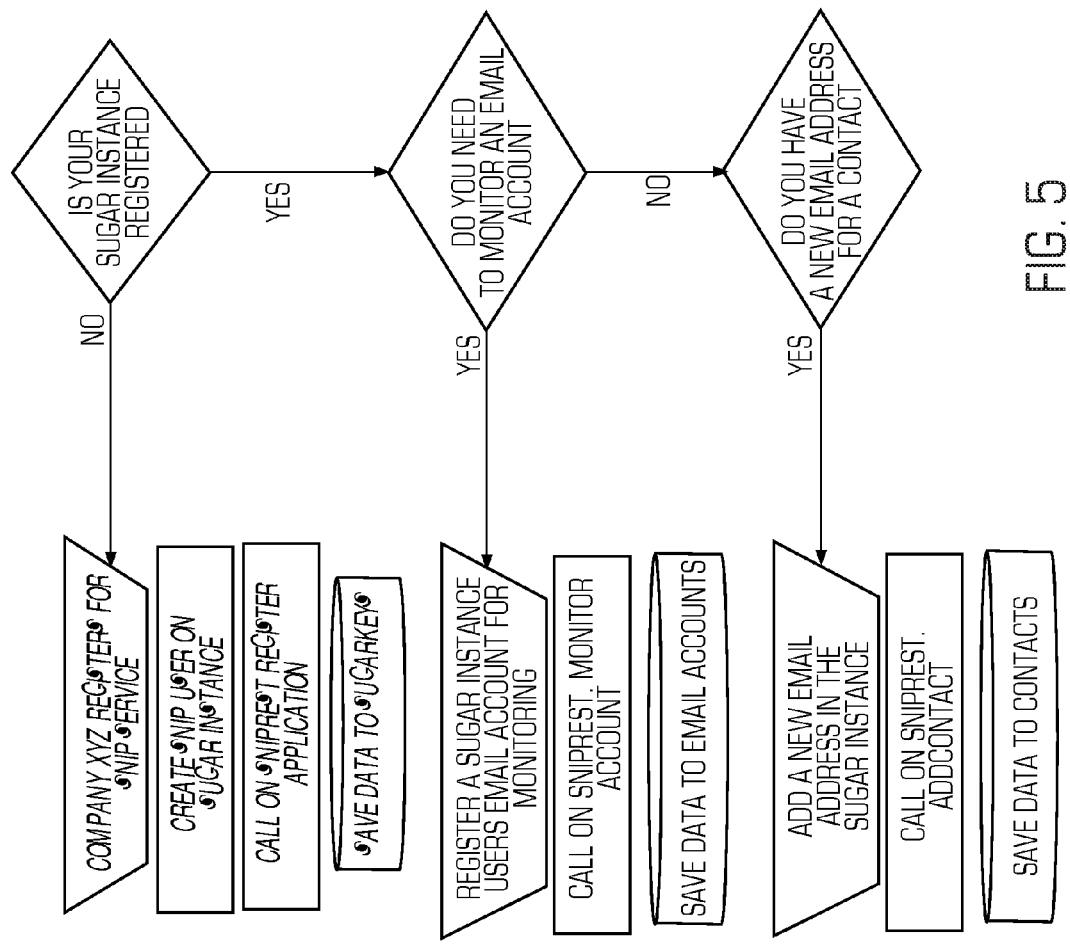
FIGS. 5-7 illustrate an email-based monitoring process.
Figure 6:
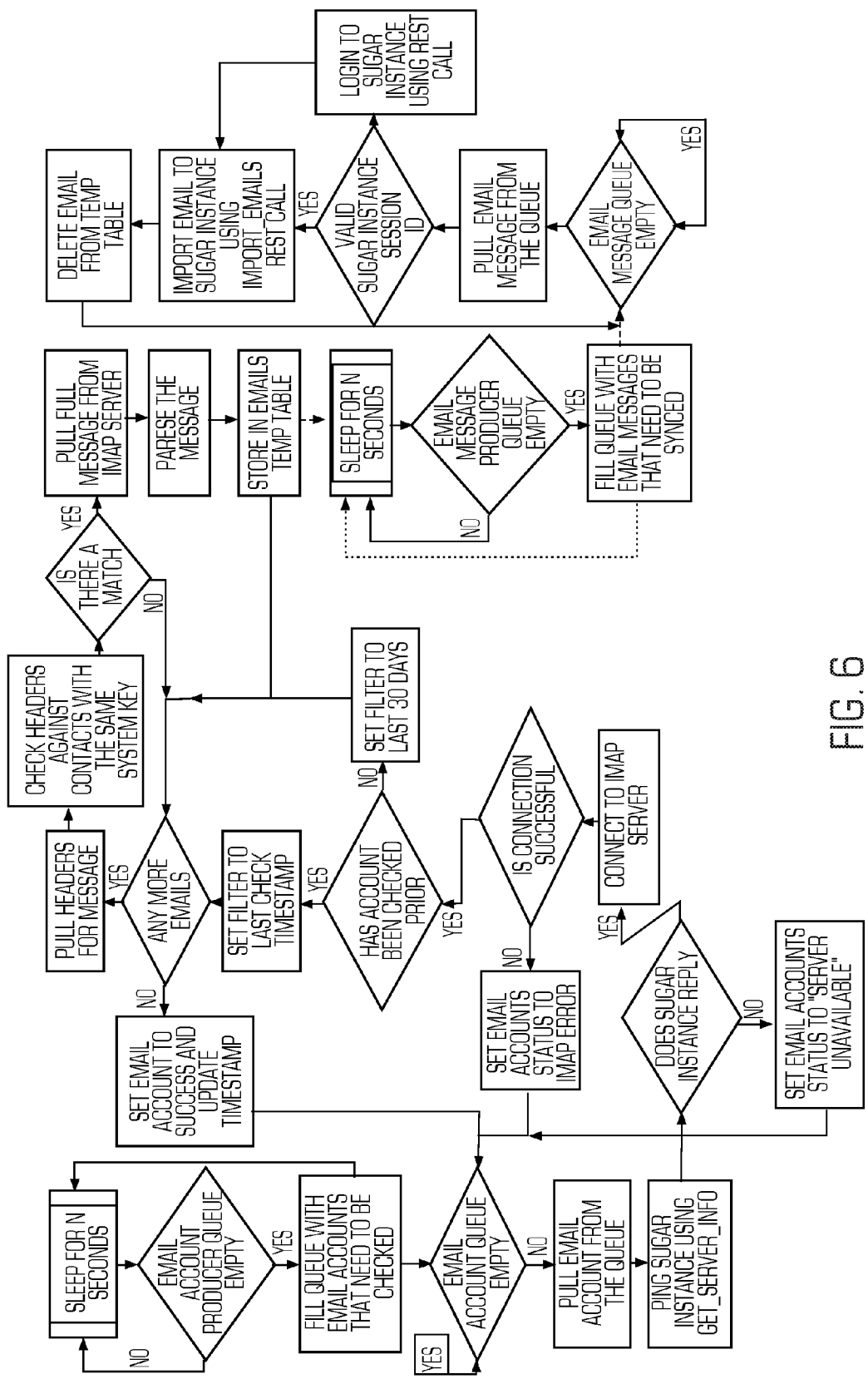
Figure 7:
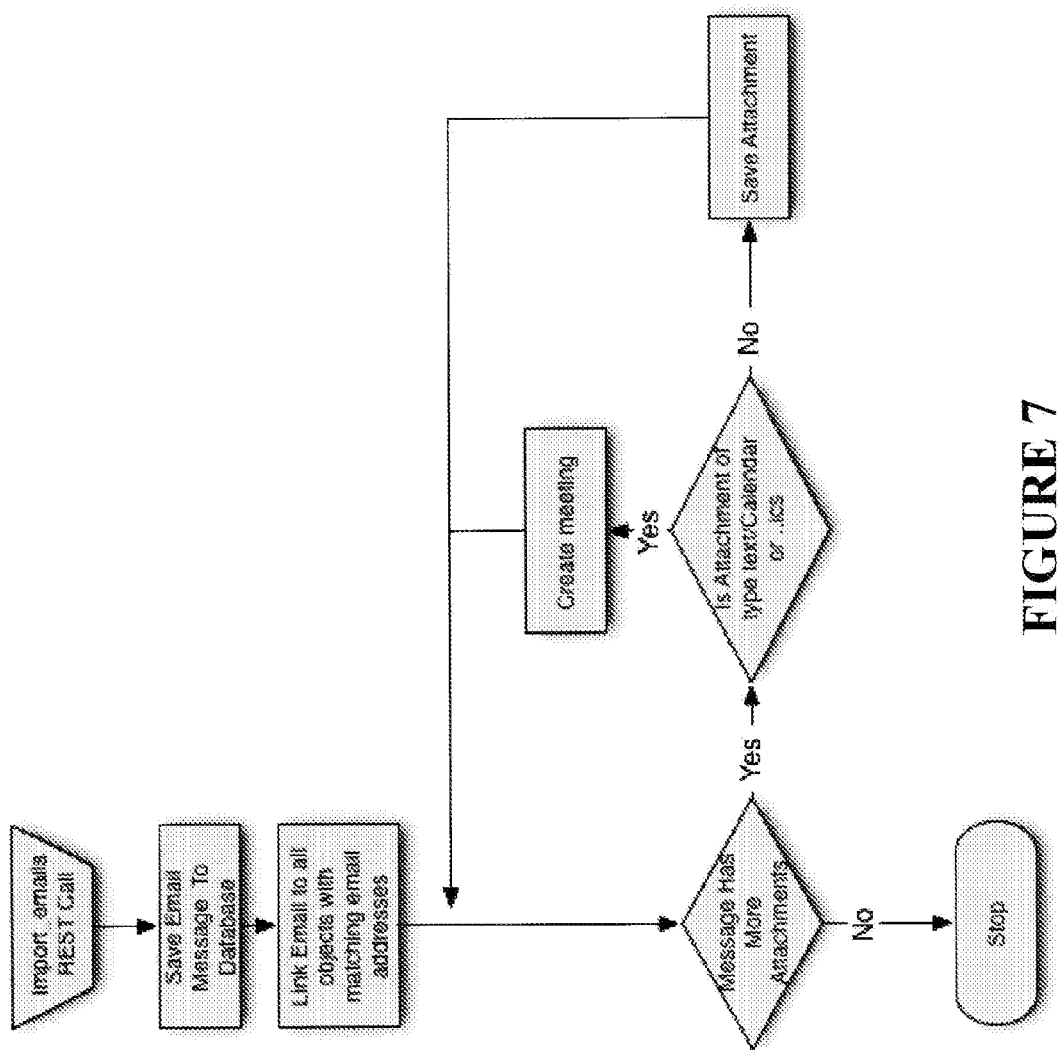

The "worker tasks" are executed by the IS either processes either periodically as defined by the IS configuration or when triggered by other tasks or external action. Custom tasks may be configured for the system. The tasks are also shown in FIGS. 5-7. Base tasks are represented below:
1. Check task
Check which Accounts are Due for Periodic Check Each CRM client may identify a set of heterogeneous external sources to be watched by the IS. These sources can be any Internet accessible content, including security-protected content. In case of security-protected content, authentication is required and can be provided by a centralized service (such as 'oauth' or independently configured with authentication parameters). Periodically, the IS scans the database listing the sources and of those that are active (not marked as 'down') and not marked as being processed, chooses those that weren't processed for a configured period of time. For each of those, the task to check these accounts is created and put in the task queue.

The IS also may be configured for auto-discovery of sources, in which case the IS service will crawl all publically accessible content for information related to the uniquely identifiable content provided by the associated CRM instance. Distance algorithms may be utilized to identify and tune content matches. Once the content match is established, the source will be permanently added to the sources database.

2. Update Task

Check Specific Account for New Information

This task checks specific sources for updates. First, the IS verifies that it can connect with CRM client that owns the source wherein each client 102 of the CRM system 100 may have rights to (own) a particular source. If the connection fails, the check is aborted. Additionally, if the connection was failing for a long time, as defined by the configuration, the CRM client is marked as 'down', which means no further checks will be made to it until the administrator resets it. If the connection is successfully established, the task will check if any new uniquely identifiable data has been added for monitoring since the last check and add that data to its database. The IS will then begin scanning for input from each of the source configured in its database (this can be an API connection, an IMAP connection, a crawler, or any other type of data acquisition interface). In the case of IMAP server, the server is scanned for new messages since the last time account was checked, or for preconfigured duration of time back (such as 2 weeks) if the account was never checked before. The messages that arrived in these periods and are not too big, as defined by the configuration, are parsed for uniquely identifiable information (which includes addressee information) and have their content retrieved.

If the configuration lists more than one source for retrieval on the CRM client, the process is repeated for each folder listed.

3. Retrieval Task

Retrieve Relevant Messages:

This task receives and encapsulates all information updates from the sources into packages transmittable to the CRM system. After retrieving the information updates, each package is scanned to match the database of relevant uniquely identifiable information stored for the CRM client that owns this account, and packages that have matching parameters are added to the retrieval queue.

Alternatively, the system can be configured so that all packages from the particular account or folder on the IS will be retrieved and pragmatically added to the system, regardless of parameters matches (see A1.3a). In this configuration, the system automatically identifies new relevant customers and contacts and pragmatically adds them to the CRM customer list for a given CRM user. This aspect of the system specifically addresses the issue of systematically adding relevant content to the CRM system without manual user actions.

Once the list of content is retrieved, the IS retrieves packages one by one from the source server (e.g. IMAP server). The package information is stored in the IS database temporarily, and each package is issued a unique identifier. The list of identifiers of the newly retrieved packages is then passed to a CRM import task (see Import Task below) that is initiated after all packages are imported.

3a. Dynamic Discovery Process Utilization

When the IS system is configured for auto-discovery, a set of algorithms may be used to locate uniquely identifiable information present in the CRM software (such as email addresses, names, URLs, etc.) and use those unique identifiers for matching against network-accessible sources. Since network accessible data may not present exact matches against data present in the CRM system a range of methods may be used to locate possible matches. Edit distance (Levenshtein distance) algorithm may be utilized for string match identification on unique identifiers such as names, addresses, emails, etc., while machine learning algorithms may be utilized to identify relevant content. For the latter, numerous inputs may be used in a supervised learning algorithm to detect possible inputs matching desired unique identifiers derived from the CRM system.

Combining the two techniques together present a way to dynamically identify possible available matches. For example, if a record in the CRM system identifies a contact with the email address Ted.Crisp@veridiantechnologies.com linked to the Account record in Los Angeles, Calif., the algorithm may locate a blog of tcrisp@gmail.com located in Los Angeles, Calif. and employed by Veridian Corp. In this case the record may be retrieved even is the source is not explicitly linked to the CRM system but is accessible to the public network. In this case the distance algorithm may have been used to provide name matching and the learning algorithm was utilized to detect all possible combinations of address matches to the contact record in question.

Since dynamic record matches may create a range of false positives, a UI may be provided for manual intervention in analyzing the results of the matching routine. An end user may choose to review the results of the scan and filter out the false positives prior to the Import task forwards the results to the CRM instance. Alternatively a scoring system may be utilized to prioritize the dynamic discovery matches (see B1.3).

4. Import Task

Send the Retrieved Messages to the CRM:

The import task receives the list of packages to be sent to the CRM client, initiates a connection with the CRM, retrieves the data from the database and sends it to the CRM (see also B1.2 below). If the result of the sending is successful, the data is deleted from the database; otherwise the package is put to the list for re-trial. The import task will be re-launched at a later time if there are any messages in the retrial list.

5. Synchronize Task

Synchronize the Contact Data with CRM:

This task contacts the CRM client registered with IS (according to the CRM instance identifier information that was passed to the task) and retrieves the list of uniquely identifiable information (e.g. email addresses) on the system for using in the retrieving the relevant messages. The current implementation retrieves uniquely identifiable information that belongs to any record of the CRM database. The set can be modified, if desired, with an exclusion filter. The visibility and access control rules are later applied to all data entries in the CRM to ensure proper security rights.

A2. Configuration Tasks

The IS includes a configuration unit, such as a server, which allows the CRM to communicate with the IS using the well-known HTTP protocol. The configuration unit may perform a number of tasks, some of which are now described in more detail.

1. Check the Status of the IS System

The CRM can retrieve the status of the system with "status" call sent to the IS configuration unit. The call will retrieve the status of the system (e.g., was it marked as 'down') and the status of all accounts associated with the CRM—including their status and when was the last successful data check and/or retrieval.

2. Add New CRM System to the IS

A "registerApplication( )" call allows a CRM client to add itself to the IS client database by passing it the unique system identifier and the data needed for IS to communicate back to the CRM, such as a URL, username and password. Depending on the configuration, this call may also check if the CRM system is licensed to use IS functionality by contacting the licensing server via HTTP request and verifying its license using the unique CRM identifier. If license is not granted, the registration process fails with the appropriate error message. If the license check is successful the IS then tries to initiate communication with CRM—if it succeeds, thus validating the passed data, new record is entered in the database of CRMs registered with the IS.

Additionally, depending on the configuration, the IS may initiate the contact synchronization task for the newly added CRM (see A1.5 above).

3. Remove the CRM System from the IS

The "unregisterApplication( )" allows the CRM client to remove itself from the IS unit, using its unique identifier. If the CRM client removes itself, all accounts associated with this CRM client also are removed.

4. Add External Service Account Relating to the CRM or Set to Auto-Discover

After registering the CRM client, accounts for individual services (such as IMAP mailboxes) can be added using "monitorAccount( )". This source is added to the database of registered data sources and will be checked next time the task A1.1 above is initiated.

If "autoMonitor( )" call is invoked with the watchAll flag set to true, the IS will be configured to periodically scan the Internet for all data related to the uniquely identifiable information provided by the CRM client. Setting watchAll flag to false will turn off the auto-monitoring feature.

5. Remove External Service Account

The "removeAccount( )" call can be used for removing specific account from the IS monitoring.

6. Add Address to a List of Relevant Addresses

The "addContact( )" call is used to add new uniquely identifiable information (such as names, email addresses, user names, etc.) to the database of the IS, and the call is initiated by the CRM when the appropriate record is created, see B3.1 below.

B. The Data Management and Presentation Module

Figure 8:
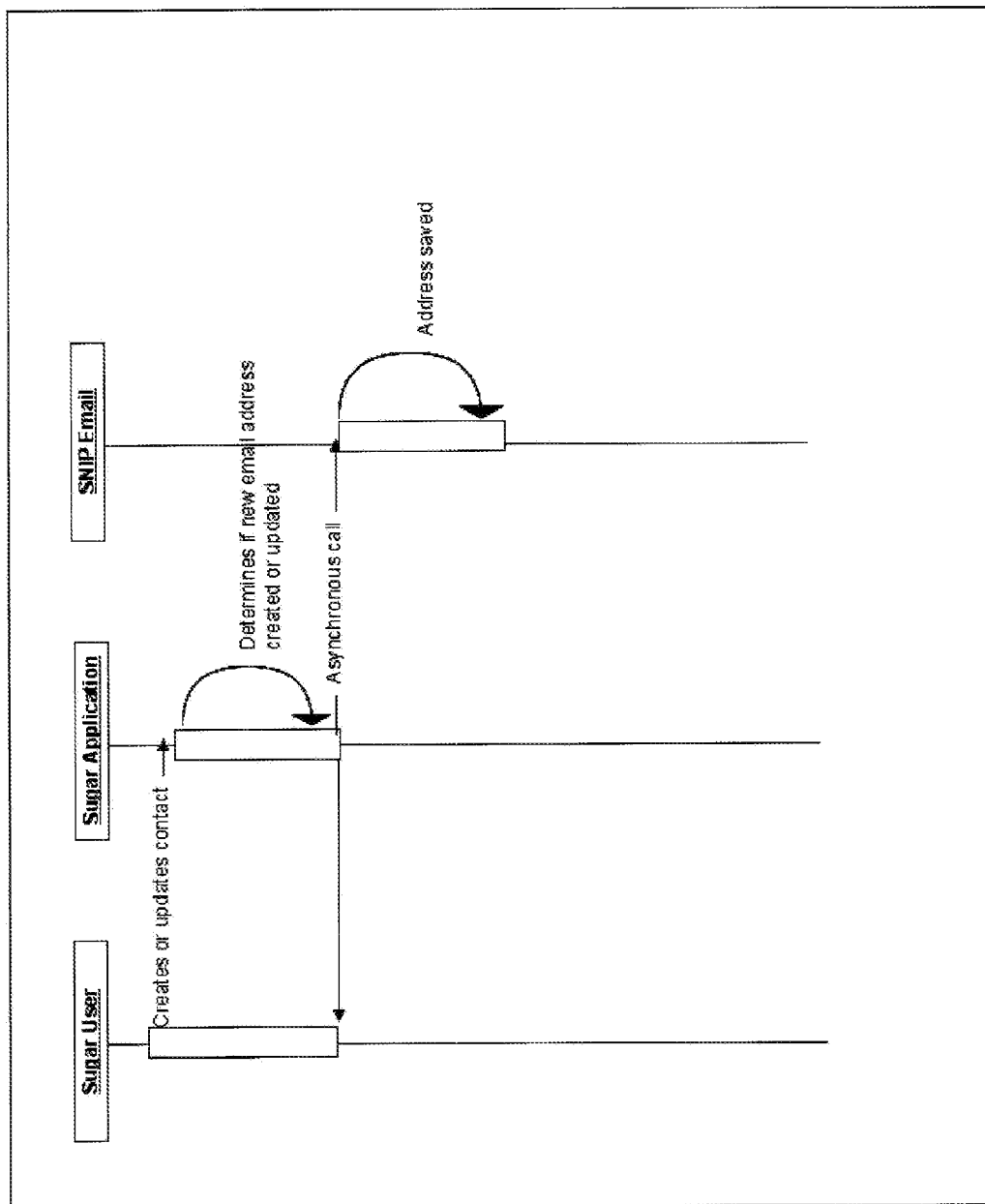
FIG. 8 is a diagram of changes to the CRM contact module flow.
Figure 9:
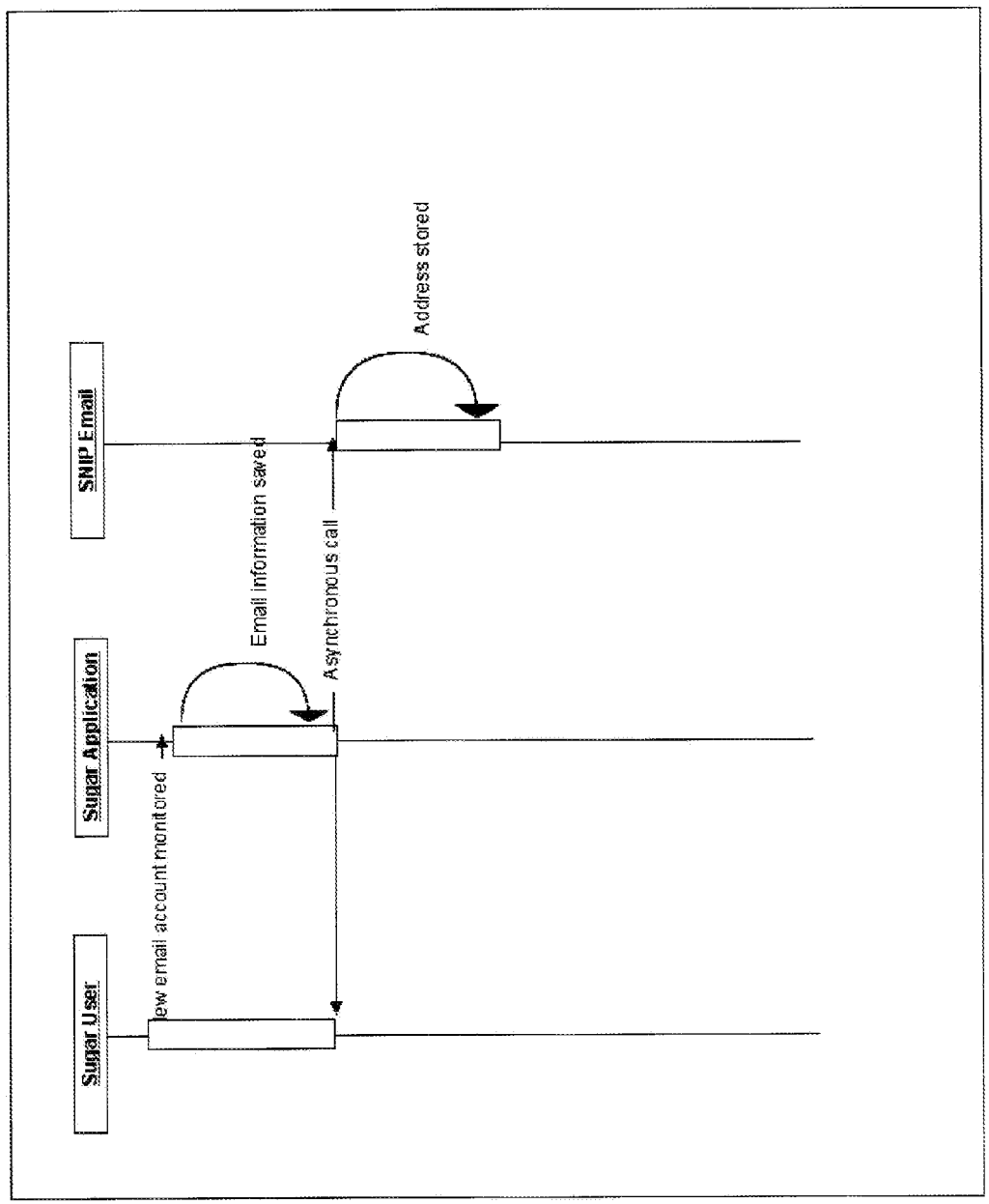
FIG. 9 is a diagram of changes to the CRM email module flow.
Figure 10:
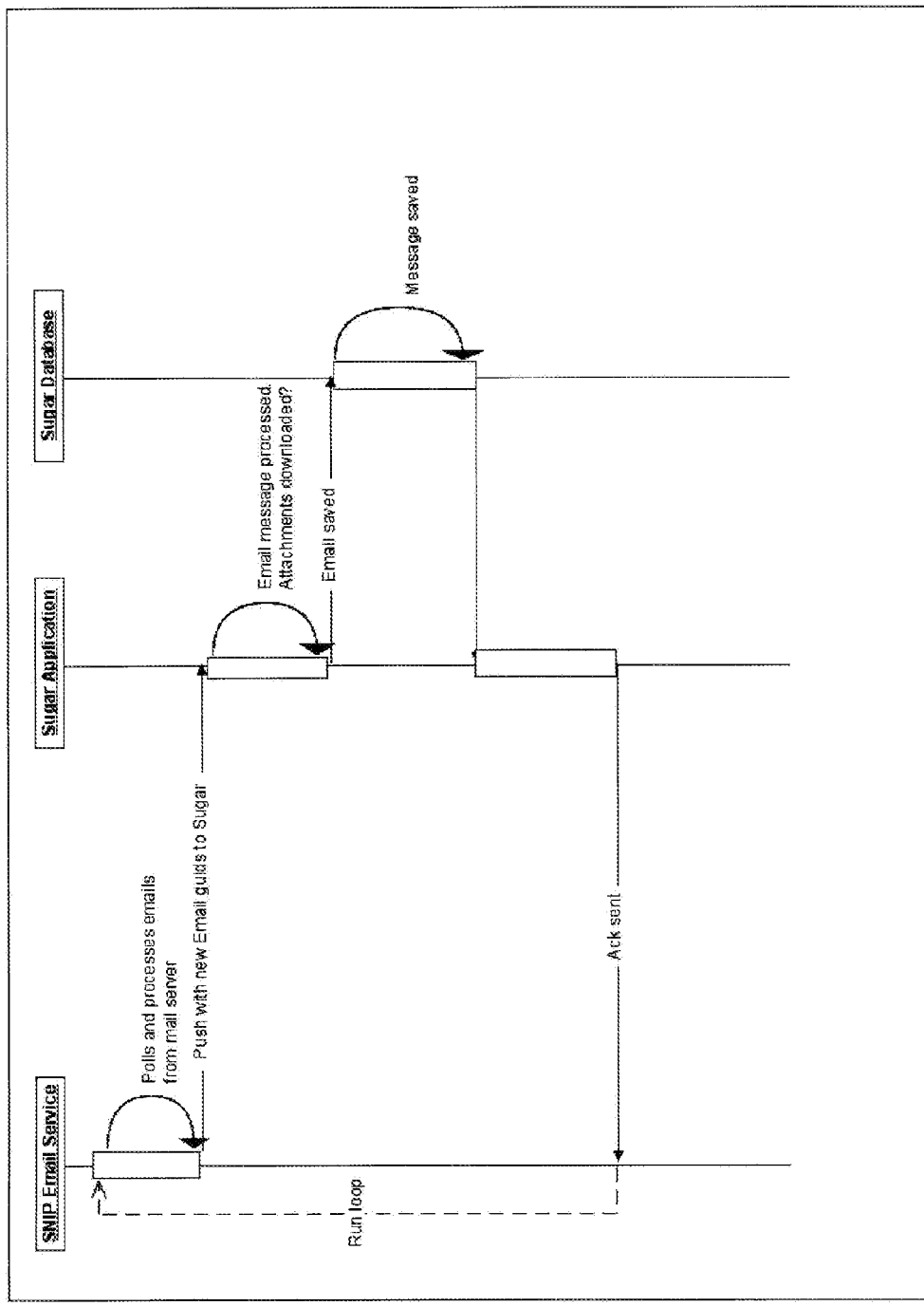
FIG. 10 is a diagram of an CRM-SNIP flow.

The data management and presentation (DMP) module is the part of the CRM system shown in FIG. 3 that receives the data from the IS and presents the data to the end user of the system. An important function of this module is to merge and correlate data received from the heterogeneous sources into a coherent stream of relevant content to be presented to the end user of the system. FIGS. 8-10 illustrate how the CRM system flow is modified for use by the system.

B1. Data Retrieval

1. Configuring the System

The CRM administrator links the system to the IS by providing the URL for IS configuration service to the CRM system. The DMP module automatically creates a service user and other details necessary for the IS to contact the CRM and initiates the registration request (see A2.2 above). Upon successful registration, the system is marked as linked to the IS. If the system was already linked to the IS, the configuration screen shows the status information from the IS (See A2.1 above). An example of the user interface for the CRM system is shown in FIG. 12.

After connecting the CRM to the IS, the administrator can configure the source accounts for the monitoring and retrieval. Each end user of the system can also configure monitoring sources for his or her specific personal accounts, using the accounts management interface, which uses the configuration server as described in A2.4 above. Administrator or user may also choose to configure the auto-monitoring feature of the IS.

After the registration of the DMP, depending on configuration, the administrator may also configure the CRM system for data synchronization as described in B3.1 below.

2. Receiving and Parsing the Communication Data

The DMP module receives the information sent by the IS (see A2.4). For each communication message, the message is parsed by the DMP module and the DMP determines the list of the recipients associated with the message (such as in an email, SMS message, or post), if any, and if the message has any file attachments. The message is then entered into the CRM database and is linked to the database record for all entities that are attached to the message. This allows the DMP to find and link all CRM entitles related to the message.

If the message contains one or more file attachments, a new CRM 'Note' object is created that contains the attached data and lists the message object as a parent. The new Note object is also related to all associated records. If the file attachment is of a type Calendar (for example, .ics format,) the 'Meeting' object is created instead, by parsing the information inside the file and retrieving the meeting details from it. Additionally, all the 'Users' and 'Contacts' records in the database that are associated with any of the email addresses associated with the message are specified as the invitees for the meeting.

Other message types may be created based of the source of the data. The generalized target type will be of a CRM type 'Note'. The body of all messages will be parsed for valuable content as described in the section B1.3 and other CRM entities may be created based on the content of messages retrieved.

Objects created by the message share the security permissions of the message. Depending on the configuration, the message is also added either to global security team, allowing everybody to access it, or to the security teams belonging to the users associated to any of the email addresses attached to the message.

3. Data Correlation and Scoring

Once all of the message data is retrieved, the DMP module inter-correlates and weights based on configurable parameters such as time, addressee information, message threads, languages, page hit ranking & subscriber base (for publicly accessible data), general linkage (such as number of viewers & friends for social graph data), and others. For example, the system may automatically tag the data in chronological order or in the order of perceived importance for further display purposes.

The weighting can be used in conjunction with the data already owned by the CRM system. In that case, existing data should be already pre-evaluated and necessary metadata (such as scores) should be extracted and augmented based on the incoming messages. In this case, the DMP combines cardinality of existing and new data that will be carried forward as the parameter. For example, total communication scores between individuals may be computed, total views from within the CRM system may be combined with related numbers derived from external sources, or total reach computed both internally to the CRM system as well as externally to use in lead management.

Scores may be contextualized within the CRM system and be specific to the related object. For example the same message may be scored highly if it is associated to the CEO at Acne Corp, but scored low when associated to the Support Rep at the same company.

B2. Data Presentation

The DMP module modifies some of the CRM presentation screens (described above) to allow the end user to see messages associated with data records.

1. Communication Data Associated with Object

When information about the object is displayed, the data about the external data associated with this object is also displayed under the main object data. The association is determined as either of:
  a. The data and the object have the same destination identifiers associated with them (such as email address).
  b. The object has a relationship with a 'Contact' record based on a uniquely identifiable information, which satisfies the condition (a).

The list of the associated data is displayed and the end user can click on any of them and review the information contained in the message. The CRM system can support various types of CRM records being associated with the communication data. For example, the CRM system may support the following types of records: 'Accounts', 'Contacts', 'Leads', 'Opportunities' and 'Cases' and the supported CRM records can be amended by the system administrators to include any custom types of records created on the particular CRM system.

2. Additional Filtering

Depending on the configuration, some object types (such as 'Cases' objects) can additionally employ filters on the data displayed as described in B2.1. For the particular 'Case' object, for example, only messages having configured template—like 'CASE:' and following case number—in the message subject will be shown.

3. Message Display

When a message is displayed to the end user, the screen includes the list of all 'Contact' records associated with email addresses associated with the message and all 'Notes' and 'Meetings' records created by the message as in B1.2. The user can click on any of these records and have the information of the associated object displayed. Attachments, messages and appointments are parsed and separated out of each individual package and are presented as distinct elements in the activity view.

4. Threaded Contextualized Data View/History View

The CRM system also can combine all new data based on various parameters (destination, timestamp, etc.) into one view per CRM object. The same data may appear differently based on which object is being accessed and which user is accessing the object. In this case the data will appear as a list of subjects/excerpts from the total data retrieved and nested based on how it was correlated (see B1.3). An example of the history panel user interface is shown in FIG. 11. FIGS. 13 and 14 illustrate a contact history subpanel user interface and email contact subpanel user interface, respectively, of the CRM system. In addition, FIG. 15 illustrates an example of an activities and history user interface derived from SNIP on Contacts detail View and FIG. 16 illustrates an example of a contacts detail view user interface with activities derived from SNIP.

B3. Data Synchronization

1. Sending data to IS from CRM

When a new CRM record associated with uniquely identifiable information is created, the CRM automatically sends the new email address to the IS system to be associated with the CRM as described in A2.6.

B4. Access and Visibility Rights

The system applies security and visibility rights to all content imported into the CRM system based on the ACL rules applied to the target associated object.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for intelligently detecting, importing and reconciling relevant electronic communications into data storage and retrieval system using two, loosely coupled network components, the system comprising
   a first computer system that executes data detection, storage and retrieval processes for representing correlated information to an end user of a business system;
   a second computer system that captures electronic communications data from one or more data sources wherein each data source is one of an external service and digitally captured conversations;
   wherein the second computer system extracts a user-supplied configuration and data from storage in the first computer system and automatically identifies relevant communications relating to a specific record in the first computer system using the user-supplied configuration and the data; and
   wherein the first computer system automatically displays the relevant communications identified by the second computer.

2. The system in claim 1, wherein the first computer system retrieves the data in one of periodically predetermined intervals and initiated explicitly by an administrator, and wherein the first computer system retries the data retrieval if the data retrieval fails, up to a time limit specified by the administrator.

3. The system in claim 1, wherein the second computer system uses a parameter and process to determine if the communication is relevant and wherein the parameter is updated by the first computer system.

4. The system in claim 1, where the successful operation of the second computer system functions with regard to the retrieval of data relevant to the first computer system can be inspected by the user of the first computer system.

5. The system in claim 2, wherein the first computer system marks a data source as inactive on repeated failure of retrieval from the data source.

6. The system in claim 2, wherein the first computer system is marked as inactive when repeated failures to import data into the first computer system occurs.

7. The system in claim 3, wherein the second computer system determines if a communication is relevant by matching a piece of key information of specific data retrieved from the second computer system with a piece of key information associated with records stored in the first computer system.

8. The system in claim 7 further comprising a store associated with the second computer system that stores a list of the pieces of key information associated with records stored in the first computer system, wherein the list of the pieces of key information is automatically updated once records are added or modified in the first computer system.

9. The system in claim 1, wherein the second computer system removes the retrieved data communications from the data source.

10. The system in claim 1, wherein the data source is an email server configured by a user of the first computer system.

11. The system in claim 10, wherein a list of email accounts and folders of the email accounts considered relevant for data retrieval are stored both on the first computer system and the second computer system, wherein the user is able to one of view and modify the list.

12. The system in claim 1 further comprising a plurality of first computer systems and a single second computer system connected to the plurality of first computer systems, wherein the plurality of first computer systems each perform data retrieval on the single second computer system independently and simultaneously.

13. The system in claim 1, wherein the second computer system further comprises a plurality of computer systems that distribute the data retrieval activity between the plurality of computer systems.

14. The system in claim 1, wherein a specific record of the first computer system is displayed together with retrieved communications data relevant to the specific record by matching key information associated with the specific record to the retrieved communications data.

15. The system in claim 1, wherein a specific record of the first computer system is displayed together with retrieved communications data relevant to the specific record by matching key information associated with other records in the system associated with the specific record.

16. The system in claim 1, wherein the first computer system, upon receipt of the electronic communication data that contains a digital file attachment with additional data, creates a separate data record in the first computer system containing the attached additional data.

17. The system in claim 1, wherein the first computer system, upon receipt of the electronic communication data that contains a calendar record, creates an event record in the first computer system.

18. The system in claim 17, wherein the event record is associated with all event participants specified in the electronic communication data that are contained in a user store of the first computer system.

19. The system in claim 7, wherein the first computer system displays the data about the specific electronic communication data with each record in the first computer system that has the same key identifiers associated with them as the electronic communication data key identifiers.

20. The system in claim 7, wherein key identifiers in the first computer system are specified by a system administrator and matched to the key identifiers in the second computer system.

21. The system in claim 7, wherein the key identifiers in the second computer system are determined based on one or more types of entities present in the first computer system and matched to the key identifiers in the target source.

22. The system in claim 15, wherein the set of the communication data records are hierarchically displayed by displaying only those communications that contain specific words or specific patterns of characters as specified by a configuration of the first computer system.

23. The system in claim 1, wherein the first computer system further comprises one or more content filters.

24. The system in claim 1, wherein each relevant communication stored by the first computer system has a security permission that allow only users of the first computer system that has access to the uniquely identifiable information used to identify the relevant communication to access the relevant communication and only the users having access to the relevant communications data record to see the record of the first computer system when the record associated with it is being displayed.

25. The system in claim 24, wherein the security permissions are determined by matching key security identifiers contained in the relevant communication to key security identifiers associated with specific user record and applying permissions of that record to the acquired communication data.

26. The system in claim 24, wherein the user of the first computer system that has access to a specific communication data record can assign additional permissions to it allowing other users to see this record.

27. The system in claim 7, wherein an administrator of the first computer system define a set of patterns such that the data retrieved from the data sources matching the patterns is not considered when matching key identifiers of the system records to key identifiers of a specific communication message for the purposes of determining the relevancy of the relevant communication.

28. The system in claim 1, wherein, upon the request of an administrator of the first computer system to use the second computer system, the second computer system automatically check if the first computer system has a license to use the functionality of second computer system using the identification data sent by the second computer system.

29. The system of claim 1, wherein the first computer system is a data management and presentation module of a CRM system.

30. The system of claim 1, wherein the second computer system is an import system server.

31. The system of claim 1, wherein the first computer system has access to source data of the second computer system based on uniquely identifiable information submitted to the second computer system per the configuration of the administrator.

32. A method for intelligently detecting, importing and reconciling relevant electronic communications into data storage and retrieval system using two, loosely coupled network components, the method comprising:
  executing, on a first computer system, data detection, storage and retrieval processes for representing correlated information to an end user of a business system;
  capturing, on a second computer system, electronic communications data from one or more data sources wherein each data source is one of an external service and digitally captured conversations;
  extracting a user-supplied configuration and data from storage in the first computer system by the second computer system and automatically identifying, by the second computer system, relevant communications relating to a selected record in the first computer system using the user-supplied configuration and the data; and
  automatically displaying, by the first computer system, the relevant communications identified by the second computer and relating to a specific record in the first computer system.

33. The method in claim 32, wherein the retrieval process further comprises retrieving the data in one of periodically predetermined intervals and initiated explicitly by an administrator, and wherein the first computer system retries the data retrieval if the data retrieval fails, up to a time limit specified by the administrator.

34. The method in claim 32, wherein automatically identifying further comprises using a parameter and process to determine if the communication is relevant and wherein the parameter is updated by the first computer system.

35. The method in claim 32 further comprising inspecting, by the user of the first computer system, where the successful operation of the second computer system functions with regard to the retrieval of data relevant to the first computer system.

36. The method in claim 33, wherein the first computer system marks a data source as inactive on repeated failure of retrieval from the data source.

37. The method in claim 33 further comprising marking the first computer system as inactive when repeated failures to import data into the first computer system occurs.

38. The method in claim 34, wherein automatically identifying further comprises determining if a communication is relevant by matching a piece of key information of specific data retrieved from the second computer system with a piece of key information associated with records stored in the first computer system.

39. The method in claim 38 further comprising storing a list of the pieces of key information associated with records stored in the first computer system, wherein the list of the pieces of key information is automatically updated once records are added or modified in the first computer system.

40. The method in claim 32 further comprising removing, by the second computer system, the retrieved data communications from the data source.

41. The method in claim 32 further comprising creating, in the first computer system upon receipt of the electronic communication data that contains a digital file attachment with additional data, a separate data record in the first computer system containing the attached additional data.

42. The method in claim 32 further comprising creating, in the first computer system upon receipt of the electronic communication data that contains a calendar record, creates an event record in the first computer system.

43. The method in claim 39, wherein the automatic displaying further comprises displaying the data about the specific electronic communication data with each record in the first computer system that has the same key identifiers associated with them as the electronic communication data key identifiers.

44. The method in claim 32, wherein automatically displaying further comprises hierarchically displaying by displaying only those communications that contain specific words or specific patterns of characters as specified by a configuration of the first computer system.

* * * * *